Aug. 13, 1957 L. C. ROBERTS 2,802,378
APPARATUS FOR MAKING SAWS
Filed Oct. 10, 1955

INVENTOR.
Leonard C. Roberts
BY
Shepherd & Campbell

United States Patent Office 2,802,378
Patented Aug. 13, 1957

2,802,378

APPARATUS FOR MAKING SAWS

Leonard C. Roberts, Atlanta, Ga., assignor to Paulding Machine & Tool Co., Dallas, Ga., a corporation of Georgia Application October 10, 1955, Serial No. 539,488

2 Claims. (Cl. 76—25)

The invention relates to an apparatus for forming saws and more particularly for performing the initial steps in the production of a saw blade like that shown in the application of Herman H. Watson, Serial No. 469,135, filed November 16, 1954.

The invention and its advantages will be best understood by reference to the accompanying drawing in which.

Figure 2:
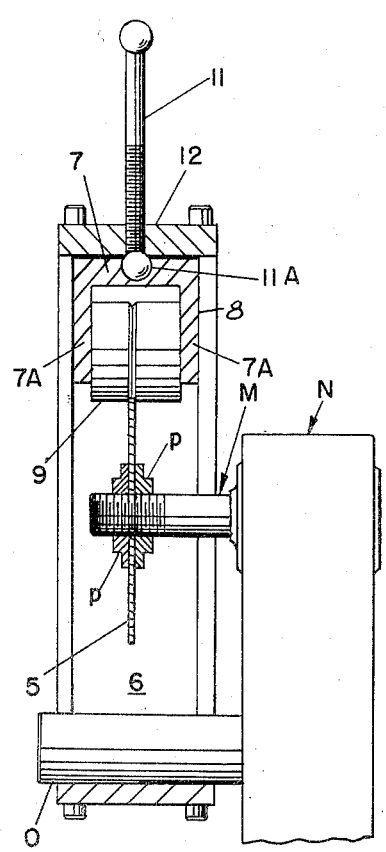
Fig. 2 is a central vertical section therethrough.
Figure 1:
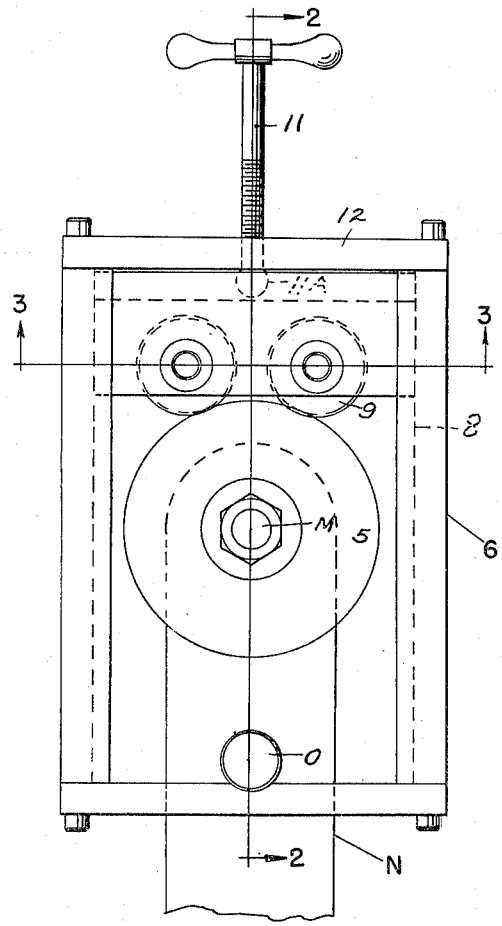
Fig. 1 is a front elevation of a flaring or swaging structure constituting a merely exemplary embodiment of the invention.
Figure 5:
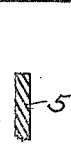
Fig. 5 is a fragmentary view showing the shape of the blank before it has been operated upon.

Like numerals designate corresponding parts in all of the figures of the drawing. The novel form of saw illustrated in the application above-named, to wit, Serial No. 469,135, comprises a web or blank the edge of which is flared to produce a part that is wider than the blank is thick, there being a portion outwardly of said part, that is pointed, said point being, preferably, aligned with the body of the blank. Broadly stated the invention consists of forcibly entering the edge of a saw blank into a groove of inverted V-shape, the width of the mouth of the groove being enough wider than the thickness of the metal of the blank that when the edge of the blank has entered the groove as far as possible, the edge of the blank will present a flared portion the widest portion of which is wider than the thickness of the blank and that portion of the blank outwardly of said widest portion will present a pointed rib.

In the particular form of the invention which I have chosen for purposes of illustration I utilize a pair of rollers having grooves of inverted V form therein and provide means for moving said rollers forcibly toward a rotating blank or disc, mounted upon a rotating mandrel. The forcible entry of the blank into the grooves of the rollers may be effected by moving the rollers toward the disc or by moving the disc toward the rollers since the result would be the same in either case.

The drawing shows a structure adapted to act upon the periphery of a circular blank 5, though the principle employed may be used in the formation of flaring and pointed webs upon band saws, hand saws, hack saws or the like.

It is common practice, in the manufacture of circular saws to mount circular blanks upon a rotating mandrel and there subject them to such operations as may be necessary. In the drawing M designates a conventional power driven rotating mandrel that is supported from a suitable frame N. A disc like blank 5 is mounted upon and is rotated by mandrel M. An open frame 6 has a yoke 7 slidably mounted in ways 8 of the frame. A pair of rollers 9 having grooves 10 of inverted V form extending circumferentially therearound is mounted between the side walls 7ª of the yoke. A thrust screw 11 is threaded through the top wall 12 of the open frame and is provided with a ball like end 11ª which acts upon the yoke to move said yoke and the rollers forcibly toward mandrel M.

Figure 4:
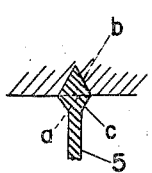
Fig. 4 is a detail view showing the shape of a saw blank after it has been acted upon by the device of my invention.
Figure 3:
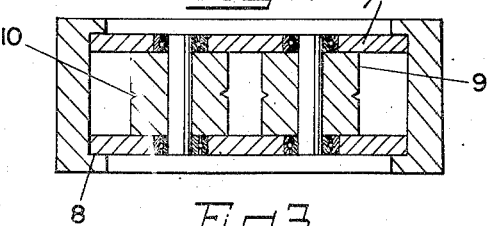
Fig. 3 is a transverse sectional view upon line 3—3 of Fig. 1.

This has the effect of forcibly entering the periphery of disc 5 into grooves 10. By referring to Fig. 4 it will be seen that the mouths of the grooves 10 are wider than disc 5 is thick. The result is that when the rollers and mandrel have been brought together as far as possible, that part of the disc at the mouth of the grooves will be materially wider than the web is thick, as at "a" in Fig. 4, while that part of the disc outwardly of said widest portion will present a continuous pointed web "b." The resultant inclined faces at "c" between 5 and "a" provide such relief or clearance for the saw as to effectively prevent binding of the saw in action. It will be appreciated that the foregoing results will be achieved in any device in which the edge of a plain blank is entered forcibly into a groove of inverted V shape, the mouth of which is materially wider than the thickness of the metal of the blank and wherein means are provided for setting up such forcible relative movement between the blank and groove carrying element as to bring about the flaring out or swaging of the material of the blank, in the manner described.

In most circular saws the saw blade is held upon the mandrel by conventional forms of nuts and washers, the present device being of that character and the nuts being indicated at "p."

If it be desired to strength the blank or disc to resist the pressure upon the edge thereof in the flaring operation, this may be accomplished by merely placing another blank of smaller diameter upon the mandrel to lie close to the disc being worked upon and holding the latter stiffening disc (not shown) in place by the same nuts "p."

A stop on the frame N, which may consist of a pin like extension O, extending from frame N, limits movement of open frame 6 toward the mandrel when power is applied by screw 11.

It is to be understood that the invention is not limited to the precise construction set forth but that it includes within its purview whatever changes fairly come within either the terms or the spirit of the appended claims.

Having described my invention what I claim is:

1. A structure of the character described comprising a rotative mandrel, means for holding a plain, disc like, blank thereon for rotation thereby, a roller having a groove of inverted V-shape extending circumferentially therearound, means for mounting said roller with its axis parallel with the axis of the mandrel and means for bodily and forcibly moving the roller toward the mandrel, the mouth of the groove being enough wider than the thickness of the blank to form a flaring portion on the periphery of the disc that is wider than the blank is thick and the inverted V shape of the groove forming a pointed rib outwardly of said flaring portion.

2. A device of the character described comprising a blank rotating mandrel, an open frame adapted to embrace the mandrel, a yoke movable endwise of the frame, means for imparting forcible endwise movement to the yoke, a plurality of rollers mounted for rotation in the yoke and having grooves of inverted V-shape extending therearound, disposed to receive the edge of a saw blank mounted upon the mandrel and means for forcibly moving the yoke and rollers endwise to the frame to forcibly enter the periphery of the blank in said grooves.

References Cited in the file of this patent

UNITED STATES PATENTS

| | | |
|---|---|---|
| 1,712,034 | Fromm | May 7, 1929 |
| 2,350,667 | Bates | June 6, 1944 |